Figure 1:
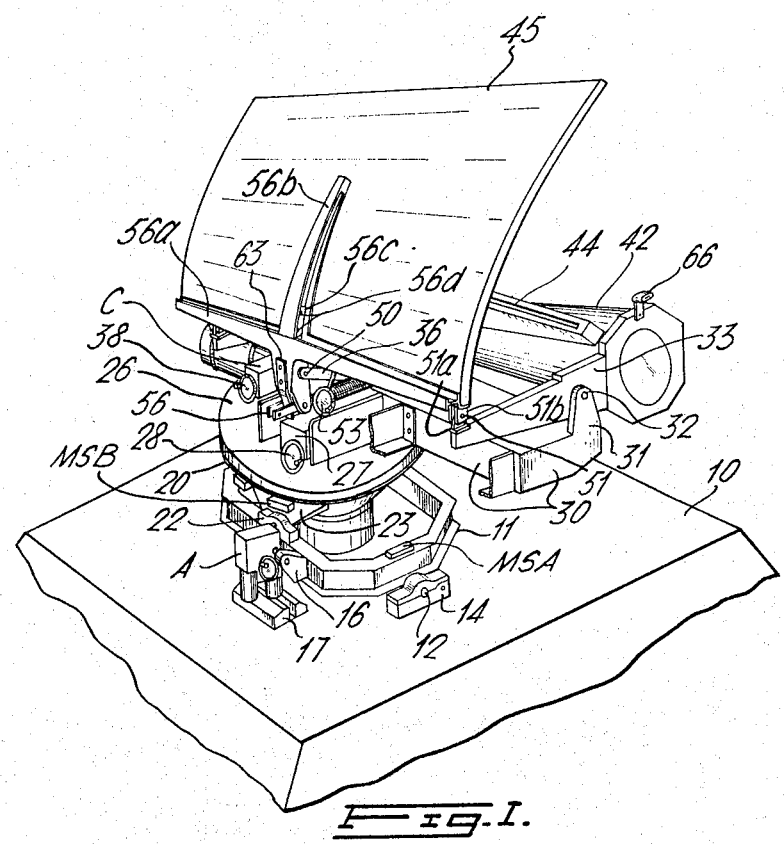

Nov. 15, 1966  J. C. BARNES  3,286,266
SPRING BIASED ACTUATOR TO MOVE RADAR REFLECTOR FROM
STOWED TO OPERATIVE POSITION
Filed April 1, 1963  6 Sheets-Sheet 1

INVENTOR
JAMES C. BARNES
By Cushman, Darby & Cushman
ATTORNEYS

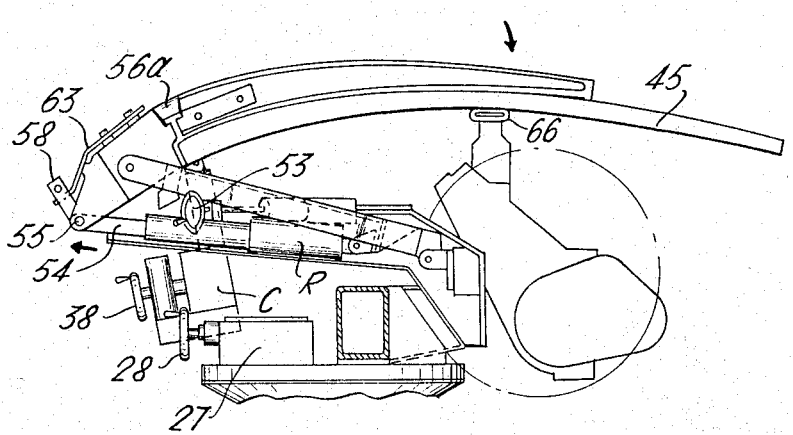
Fig. 7.
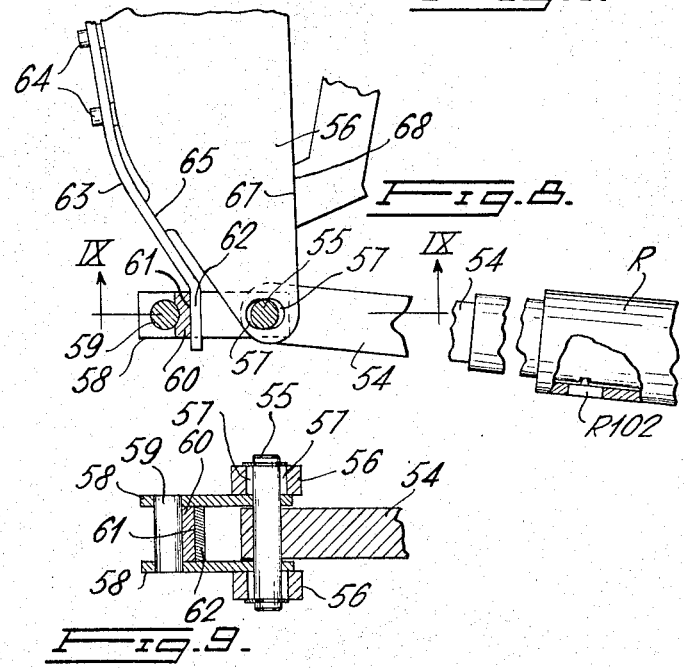
Fig. 8.
Fig. 9.
INVENTOR
JAMES C. BARNES
By Cushman, Darby & Cushman
ATTORNEYS

United States Patent Office 3,286,266
Patented Nov. 15, 1966

3,286,266
SPRING BIASED ACTUATOR TO MOVE RADAR REFLECTOR FROM STOWED TO OPERATIVE POSITION
James C. Barnes, Ottawa, Ontario, Canada, assignor to National Research Council, Ottawa, Ontario, Canada, a body corporate
Filed Apr. 1, 1963, Ser. No. 269,365
Claims priority, application Canada, Nov. 20, 1962, 862,685
3 Claims. (Cl. 343—761)

This invention relates to an antenna array for use as part of a radar system. It is more especially suited to use with a radar system constructed to locate the positions of weapons by obtaining echoes from projectiles fired by such weapons, or alternatively for calculating points of burst of friendly projectiles observed in a similar manner. Such a radar system is described in W. C. Brown et al., U.S. Patent No. 3,182,319.

This system requires an antenna assembly that will generate a narrow radar beam (e.g. 16 mils diameter) and will scan said beam through two closely vertically superposed horizontal arcs to form upper and lower fan-shaped beams (e.g. a scan of 400 mils). A mil is equal to 360°/6400°. A projectile travelling in a trajectory intersecting these beams will return echoes to the antenna for display in a manner permitting determination of the range and azimuth values of such intersections. A computer is then employed to extrapolate from these intercepts to find the point on a working plane (usually extending through the ground at the point of firing or burst) through which the trajectory passes.

The operator must be able to direct the antenna array in azimuth, in order to align the beams generally with the area in which the trajectory of interest lies. He must also be able to set the angle of sight of the antenna, that is, to set the angle which the lower beam makes with the horizontal. The angle of divergence between beams will normally be fixed at a convenient small angle (e.g. 40 mils) by the antenna structure, but may be variable, if preferred.

The antenna array will include a reflector and a scanner for projecting radar energy towards the reflector for reflection of the beams into space. The reflector will be semi-parabolic and will produce generally horizontal beams when it is nearly vertical in its erect, operating position. It will also have a lowered, stowed position in which it rests on suitable supports in a generally horizontal attitude. It will be mounted to pivot on a horizontal axis between these two positions.

An antenna assembly incorporating this construction, as well as control mechanisms for moving the reflector between its erect and its stowed positions, has been described and claimed in E. F. V. Robinson et al., Canadian patent application Ser. No. 862,142, filed Nov. 12, 1962, now Canadian Patent No. 731,268, granted Mar. 29, 1966.

The present invention is concerned with means, associated with such a movable reflector, which enables the reflector to withstand substantial mechanical loading (as from wind forces) without significant deviation from its true operating position. As will be appreciated, the reflector presents a large surface to the wind in its erect, operating position, and the resulting forces can be substantial. Unless the position of the reflector is maintained within close limits, however, the accuracy of the radar system suffers seriously. Upward movement of the reflector is controlled by an actuator so that when the reflector reaches the desired position a suitable abutment surface on the reflector comes into engagement with a fix stop. This stop can readily be made to define the desired position accurately, if the application of external forces to the reflector is ignored. In practice, however, such forces cannot be ignored, and, when they act in the direction which tends to cause separation of the reflector abutment surface from the stop, some such separation must be expected. Separation could perhaps be avoided or minimized by increasing the accuracy of the controls, but at the expense of considerable complexity in the controls.

The object of the present invention is to provide means for holding the reflector abutment surface and the fixed stop firmly together even under adverse loading conditions in order to ensure accurate reflector positioning, and moreover to achieve this result without complicating the control system and without consequent increase in the size and cost of the structure and mechanisms employed.

This object is achieved by a radar antenna array comprising
 (a) a reflector,
 (b) means mounting said reflector on a frame for pivoting about a horizontal axis between an erect, operating position and a lowered, stowed position,
 (c) an actuator extending between said reflector and said frame for controlling pivotal movement of said reflector about said axis,
 (d) a stop fixed on said frame for co-operation with an abutment surface on the reflector to define said erect position,
 (e) spring means connecting said actuator to said reflector,
 (f) means for energizing said actuator to move said reflector into erect position to bring said abutment surface into engagement with said stop and thereafter to stress said spring means,
 (g) and limit means for de-energizing said actuator only after travel thereof a distance sufficient both to bring about said engagement and to stress said spring means.

The accompanying drawings illustrate one manner in which the invention may be carried into practice. It is to be understood that the antenna assembly specifically illustrated in the drawings and described in relation thereto is furnished by way of example of the invention only, and that the broad scope of the invention is limited only by the appended claims.

Figure 2:
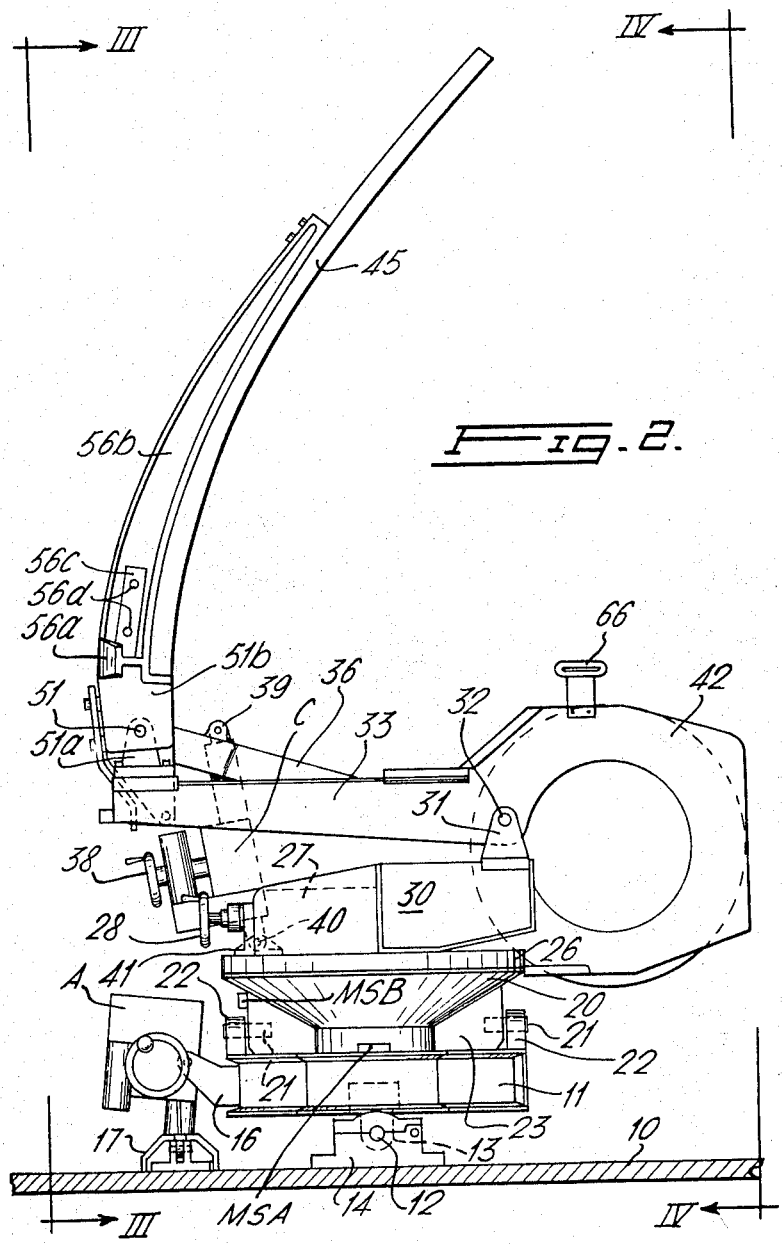
Figure 3:
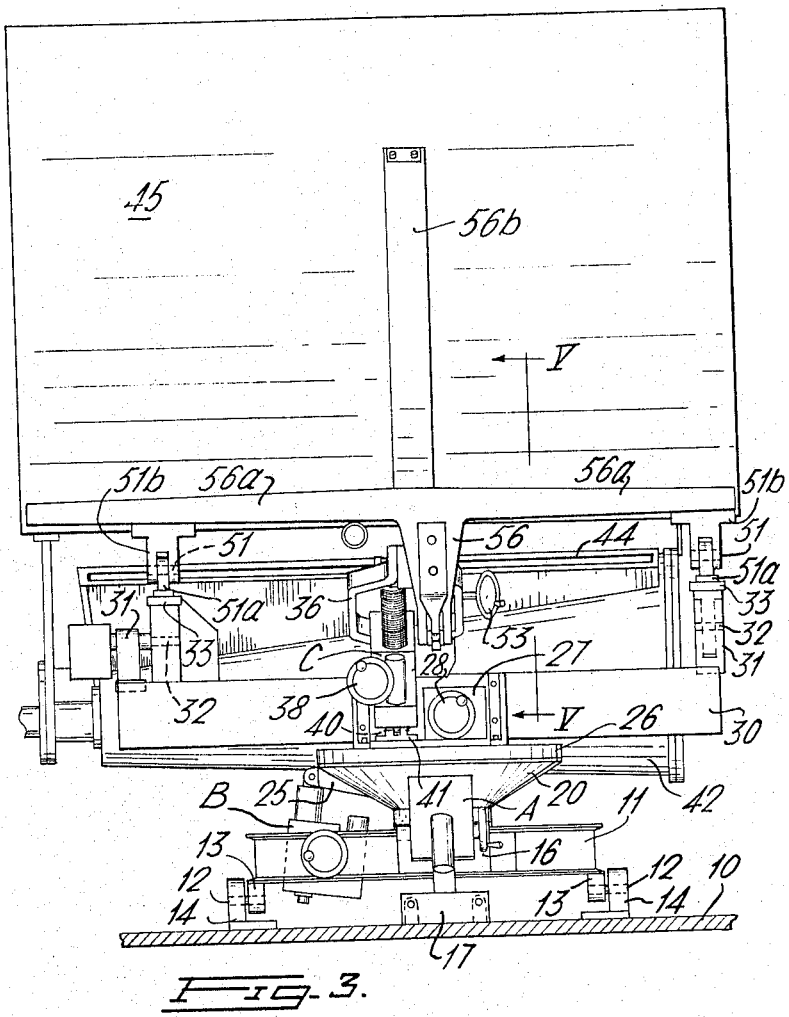
Figure 4:
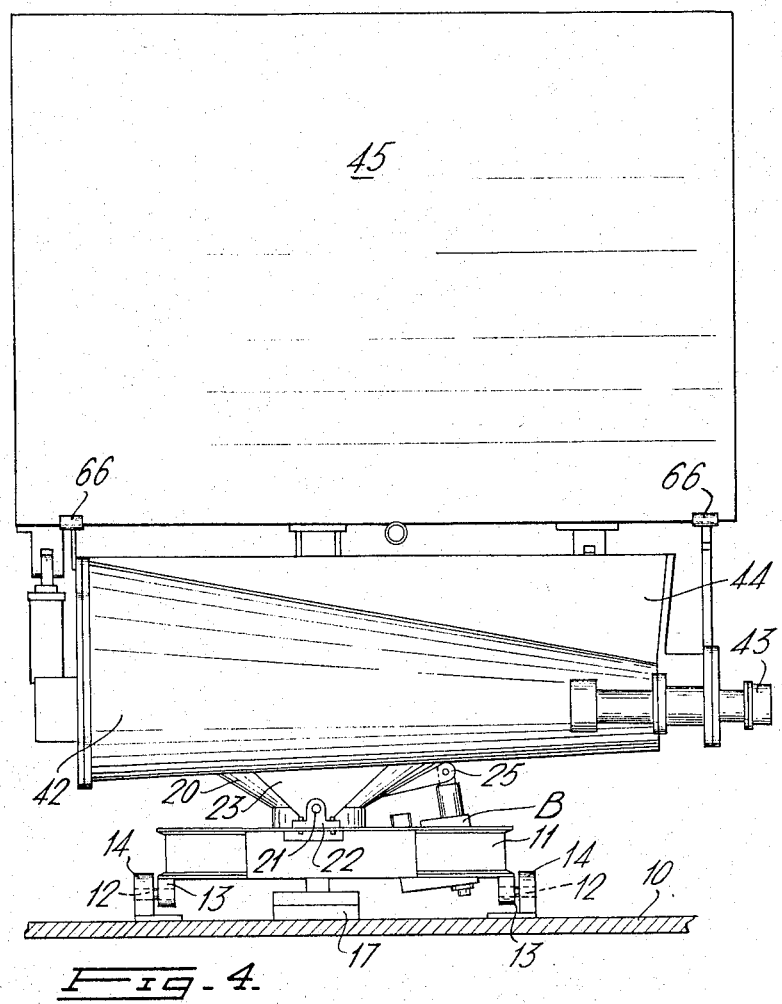
Figure 5:
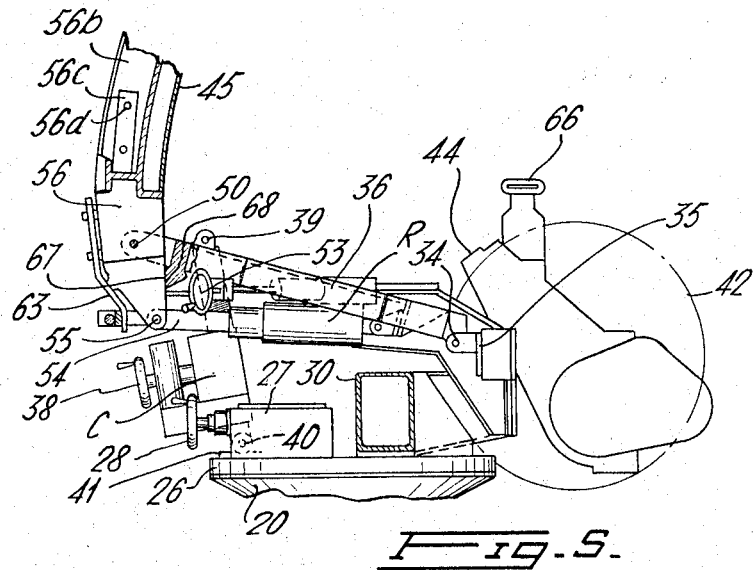
Figure 6:
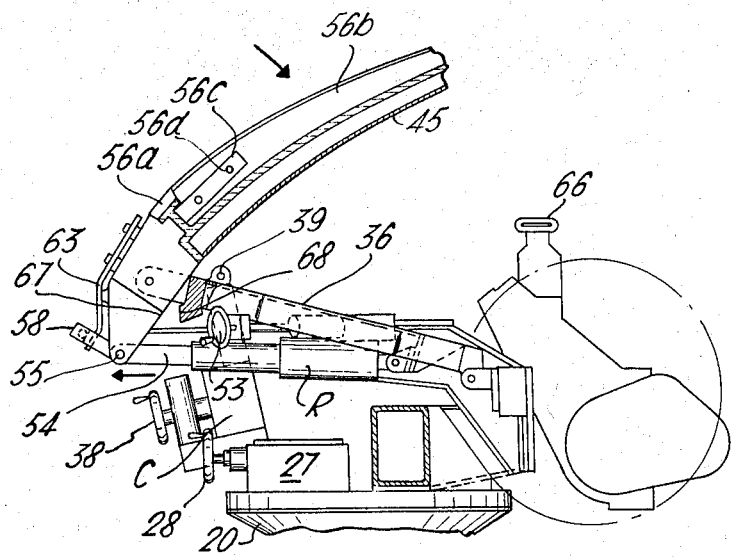

In the drawings:
 FIGURE 1 is a general perspective view of an antenna assembly;
 FIGURE 2 is an end view of the assembly of FIGURE 1;
 FIGURE 3 is a rear view of the assembly of FIGURES 1 and 2 seen on the line III—III in FIGURE 2;
 FIGURE 4 is a front view seen on the line IV—IV in FIGURE 2;
 FIGURE 5 is a fragmentary view of a portion of the operating mechanism taken on the line V—V in FIGURE 3;
 FIGURE 6 shows the same parts as FIGURE 5 in a different position;
 FIGURE 7 shows the same parts as FIGURES 5 and 6 in yet another position;
 FIGURE 8 shows an enlarged fragmentary view of a portion of FIGURE 5; and
 FIGURE 9 is an underside view taken on IX—IX in FIGURE 8.

The antenna assembly shown in FIGURES 1 to 4 is assumed to be mounted on the roof 10 of a military vehicle or other generally horizontal base surface. A framework 11 is pivotally mounted on the base surface 10 about an axis defined by pins 12 which engage depending brackets 13 on the frame 11 and upstanding bearings 14 secured to the surface 10. Control of tilting movement of frame 11 about pins 12 is exercised by an actuator A connected to a bracket 16 projecting rearwardly from the frame 11, and having its extensible element connected to a mounting 17 on the surface 10. A mercury bubble switch MSA mounted on frame 11 detects the sense of any deviation from the horizontal about the axis of pins 12 in excess of a small value, for example 1½ minutes of arc. A bubble assembly comprising more than one bubble may be used if desired for increased sensitivity or lower cost.

To provide a second horizontal axis of rotation at right angles to that defined by the pins 12, a platform 20 is mounted on the frame 11 by pins 21 which engage bearings 22 projecting from the top of the frame 11 and brackets 23 depending from the platform 20. Control of tilting about pins 21 is exercised by a second actuator B similar to the actuator A. Actuator B is mounted on the frame 11, while its extensible element engages a bracket 25 secured to the platform 20. Platform 20 carries a second mercury bubble switch MSB which will detect the sense of any deviation from the horizontal of such platform in excess of 1½ minutes of arc about the axis of pins 21. Thus, by suitable control of actuators A and B by respective mercury switches MSA and MSB in the manner described in the above mentioned prior application, platform 20 can be brought to a truly horizontal position regardless of the tilt of the surface 10, within the limits of travel permited by the gimbal-like mounting afforded by pins 12 and 21 and the full throw of each of actuators A and B.

Platform 20 carries a turntable 26 which can be rotated on the platform 20 about a central vertical axis to rotate the antenna array in azimuth. Rotation about this vertical axis is controlled by a motor 27 (or, for manual operation, by handwheel 28). Secured to the upper surface of the turntable 26 is a transverse girder 30 which, at the front edge of each of its extreme ends, is formed with an upstanding bearing 31 which supports a pin 32. Antenna support members are journalled on pins 32 which thus define a horizontal axis about which the antenna can rock to vary its angle of sight. Positioned between the pins 32 is a third pin 34 (FIGURE 5) supported by a bracket 35 secured to a scanner 42. Pin 34 secures a stay bar 36 to the scanner 42. The frame constituted by members 33, scanner 42 and other parts secured thereto is a rocking frame which can pivot about pins 32 to vary the angle of sight of the radar beams. Such movement is controlled by an actuator C (or its handwheel 38), the extensible element of the actuator C being secured by a pin 39 to the stay bar 36, while its casing is secured to the turntable 26 by a pivotal connection consisting of a pin 40 and a bracket 41.

The scanner 42 forms the front edge of the rocking frame. This scanner 42 is driven by motor 43 which projects a radar beam through a horn structure 44 for reflection into space as a focused beam by a semi-parabolic reflector 45. The scanner 42 causes this beam to scan back and forth horizontally in two arcs to project two fan-shaped radar beams from the reflector 45. The lower of these fan-shaped beams travels horizontally out from the reflector 45 (where the angle of sight is zero) and the upper beam makes a small angle (e.g. 40 mils) with the lower beam. When the actuator C is operated to vary the extension of its extensible element and thus tilt the antenna rocking frame, the reflector 45 and the scanner 42 are both tilted so that the angle of sight of both radar beams is varied, while the spatial relationship between the reflector 45 and the scanner 42 and between the beams is maintained constant. The range of this movement might typically be from +12° to −6° angle of sight of the lower beam in relation to the horizontal.

Yet another movement of the reflector 45 is possible for the purpose of lowering the reflector for stowage. Such stowage of the reflector 45 is demonstrated by a comparison between FIGURES 5, 6 and 7, FIGURE 5 showing the reflector 45 in its operational position, FIGURE 6 showing the reflector partly lowered and FIGURE 7 showing the reflector fully stowed. The pivotal axis for this movement is defined by a pin 50 supported in the end of stay bar 36, and, coaxially therewith, pins 51 supported on bearings 51a mounted on frame members 33 at each end of the assembly. Pin 50 engages a double bracket 56 which projects downwardly from the centre of a beam 56a extending along the bottom rear edge of the reflector 45 enhancing the rigidity of such reflector and carrying bearings 51b. The stowage motion is controlled by a power operated actuator R incorporating a manually operable wheel 53. The movable element 54 of the actuator R is pivotally connected to the reflector 45 by a pin 55 which extends through the extreme lower end of the bracket 56. A further bracing strut 56b secured to beam 56a by plate 56c and bolts 56d extends for the greater portion of the distance up along the back surface of reflector 45.

As best seen from FIGURES 8 and 9, pin 55 seats in slightly elongated holes 57 in the bracket 56 while tightly engaging a pair of plates 58 joined together by a pin 59. A block 60 secured to the pin 59 presents a flat face 61 for engagement with an end portion 62 of a strong leaf spring 63 secured to the bracket 56 by bolts 64 so as to bear with a central portion against a raised surface 65 of such bracket. When the movable element 54 of actuator R is extended, it rotates the members 56, 56a and 56b and hence the reflector 45 about pins 50, 51, moving through the semi-stowed position shown in FIGURE 6, until the stowed position shown in FIGURE 7 is reached with the reflector surface resting on padded supports 66. When the reflector 45 is to be re-elevated into its erect, operating position, the actuator R is contracted to withdraw its movable element 54. As the parts move into the erect position, an abutment surface 67 on the bracket 56 (FIGURES 5, 6 and 8) comes to bear against a fixed stop 68 formed on the stay bar 36. The actuator R is energised to continue to withdraw its movable element 54 slightly beyond this position, such further movement being absorbed by travel of the pin 55 within the elongated holes 57 with deflection of spring 63 about surface 65. As the pin 55 moves towards the ends of the elongated holes 57 remote from the spring 63 further movement is stopped by a limit switch R102 which is shown diagrammatically in FIGURE 8. FIGURE 8 shows the position of the parts at this moment. When the reflector is in the lowered position, or at any intermediate position, pin 55 will bear against the left hand ends of holes 57 (that is, left hand as seen in FIGURES 8 and 9) and the spring 63 will have little or no bending stress applied to it.

In the erect position, the additional force exerted by the spring 63 on the surface 65 acts to hold the abutting surface 67 and stop 68 in very firm contact with each other, even when the reflector 45 is subjected to substantial forces resulting from wind loads. Wind bearing against the front of the reflector 45 will tend to press surface 67 and stop 68 even harder into contact with each other, but wind bearing against the rear of the reflector 45 will have the reverse effect and would tend to separate these parts if it were not for the force exerted by spring 63. Sufficient resistance to any separating movement is provided by the stressed spring 63 for all wind velocities likely to be encountered in practical operation.

Spring 63 permits the use of an effective mechanical stop against a uni-directional force thereby avoiding the need for a bi-directional control system of extreme precision.

I claim:
1. A radar antenna array comprising
   (a) a reflector,
   (b) means mounting said reflector on a frame for pivoting about a horizontal axis between an erect, operating position and a lowered, stowed position,

(c) an actuator extending between said reflector and said frame for controlling pivotal movement of said reflector about said axis, (d) a stop fixed on said frame for co-operation with an abutment surface on the reflector to define said erect position, (e) spring means connecting said actuator to said reflector, (f) means for energising said actuator to move said reflector into erect position to bring said abutment surface into engagement with said stop and thereafter to stress said spring means, (g) and limit means for de-energizing said actuator only after travel thereof a distance sufficient both to bring about said engagement and to stress said spring means.

2. A radar antenna array comprising (a) a reflector, (b) means mounting said reflector on a frame for pivoting about a horizontal axis between an erect, operating position and a lowered, stowed position, (c) an actuator extending between said reflector and said frame for controlling pivotal movement of said reflector about said axis, (d) a stop fixed on said frame for co-operation with an abutment surface on the reflector to define said erect position, (e) a leaf spring secured at one end to said reflector, bearing with a central portion against a surface of said reflector and at its other end against said actuator, (f) means for energising said actuator to move said reflector into erect position to bring said abutment surface into engagement with said stop and thereafter to stress said spring, (g) and limit means for de-energising said actuator only after travel thereof a distance sufficient both to bring about said engagement and to stress said spring, 3. A radar antenna array according to claim 2, wherein said actuator is further connected to said reflector by means of a pin cooperating with an elongated hole, said pin bearing against one end of said hole when said spring is substantially unstressed and being arranged to move away from said one end towards the other end of said hole when said spring is stressed.

No references cited.

HERMAN KARL SAALBACH, *Primary Examiner.*

E. LIEBERMAN, *Assistant Examiner.*